US009003912B2

United States Patent
Daniel et al.

(10) Patent No.: US 9,003,912 B2
(45) Date of Patent: Apr. 14, 2015

(54) DISENGAGING GEAR UNIT

(75) Inventors: Jeffrey K. Daniel, Houston, TX (US); Bradford Newcomb, Houston, TX (US)

(73) Assignee: Omni USA, Inc., Houston, TX (US)

(*) Notice: Subject to any disclaimer, the term of this patent is extended or adjusted under 35 U.S.C. 154(b) by 1306 days.

(21) Appl. No.: 12/434,429

(22) Filed: May 1, 2009

(65) Prior Publication Data

US 2010/0275708 A1 Nov. 4, 2010

(51) Int. Cl.
*F16H 1/16* (2006.01)
*F16H 29/20* (2006.01)
*F16H 57/039* (2012.01)
*F16H 57/022* (2012.01)
*F16H 57/021* (2012.01)

(52) U.S. Cl.
CPC ............ *F16H 57/039* (2013.01); *F16H 57/022* (2013.01); *F16H 2057/0224* (2013.01); *F16H 2057/0213* (2013.01)

(58) Field of Classification Search
USPC ........ 74/89.14, 395, 396, 397, 405, 406, 425, 74/426, 427, 567; 277/630, 637, 641, 642
See application file for complete search history.

(56) References Cited

U.S. PATENT DOCUMENTS

| 3,964,335 | A | | 6/1976 | Gerard | |
|---|---|---|---|---|---|
| 4,616,803 | A | * | 10/1986 | Schils | 251/14 |
| 5,186,068 | A | * | 2/1993 | Heller | 74/425 |
| 5,836,076 | A | * | 11/1998 | Duta et al. | 29/893.1 |
| 6,237,863 | B1 | * | 5/2001 | Smith | 239/722 |

* cited by examiner

*Primary Examiner* — Thomas R. Hannon
*Assistant Examiner* — Adam D Rogers
(74) *Attorney, Agent, or Firm* — Haynes and Boone, LLP (57) ABSTRACT

Reduction gear units are provided comprising a gearbox, a cam assembly, a bearing assembly, a first gear and a second gear. The first and second gears may engage one another and translate rotating movement from one axis to an axis perpendicular thereto. The second gear is disengagable from the first gear by action of the cam assembly, which is adapted to disengage the second gear from the first gear through eccentric rotation of the cam assembly. In one embodiment, a bearing assembly carried by the cam assembly is preloaded. The cam assembly is disposed so that the preloaded can be maintained during manufacture of the gearbox. In another embodiment, the gearbox case and cam assembly are disposed so as to minimize internal leakage from the case and enhance sealing of the gearbox.

8 Claims, 7 Drawing Sheets

DISENGAGING GEAR UNIT

BACKGROUND

The present invention relates generally to disengagable reduction gear units having bearings that are preloaded. Methods of use are also provided.

In the manufacture of disengagable reduction gearboxes, rotary bearings are utilized in the gearbox case to support input shafts and output shafts permitting rotation of the shafts. One particular type of bearing utilized in gearboxes is a thrust bearing, which is designed to support radial loads (thereby permitting rotation) and also high axial thrust loads. Thrust bearings may have a variety of configurations. One type of thrust bearing is a tapered roller bearing which consists of small tapered rollers disposed between a bearing cone and a bearing cup and arranged so that the axes of the rollers converge at a point on the axis of the bearing around which the cup and the cone are centered. One characteristic of thrust bearings is that they can be "pre-loaded" with an axial force when they are installed in an assembly. When a thrust bearing is pre-loaded, a certain amount of compressive force is applied to the cone as it seats in the cup of the bearing. The amount of pre-loading is determined by the particular use of the bearing. A significant pre-load generally makes the bearing harder to rotate, whereas minimal preloading leaves the bearing "loose." Those skilled in the art with the benefit of this disclosure will appreciate that bearing pre-loading settings are often very precise and any variance or unintended change in the bearing pre-load that arises during the manufacturing process can hamper operation of the assembly in which they are utilized. Such variances or unintended changes in a pre-loaded bearing are often hard to prevent during the manufacturing process. This is particularly true of heavy equipment such as gearboxes where precision is often hard to maintain. Thus it would be desirable to provide a disengagable reduction gearbox in which thrust bearings utilized therein can be pre-loaded prior to assembly into the gearbox, and the desired pre-loaded can be maintained throughout the manufacturing process.

Likewise, in the manufacture of disengagable reduction gearboxes, the housing or case in which a shaft is supported must often be bored or otherwise machined to create a seat into which a movable bearing/shaft assembly is inserted. If the foregoing step is not performed with due care, o-ring seals between the bearing/shaft assembly and the gearbox housing are highly likely to leak oil or other lubricant contained within the gearbox. Moreover, such poor seals also enable the ingress of dirt or other debris into the gearbox case, thus potentially damaging the bearings, gears, or other internal components of the gearbox. Of course, those skilled in the art with the benefit of this disclosure will appreciate that the greater the precision used to machine such seats, the more expensive and time consuming the manufacturing process becomes. Thus, it would be desirable to provide a disengagable reduction gearbox with a sealing mechanism in which proper functioning is less dependent on the manufacturing process. It would also be desirable if such sealing mechanism not only inhibits leaks from within the gearbox, but also inhibits dirt or other debris from entering the interior of the gearbox.

SUMMARY

The present invention relates generally to disengagable reduction gear units having bearings that are preloaded. Methods of use are also provided.

An example of a gearset of the present invention comprises a gearbox; a cam assembly comprised of a first cam body having an outer surface disposed around a first cam axis and an inner bore disposed around a second cam axis, wherein the first and second cam axis are axially offset from one another, wherein a portion of said inner bore is threaded so as to form a threaded inner bore; a bearing assembly disposed within said threaded inner bore of said cam assembly; a threaded fastener engaging said threaded bore and abutting said bearing assembly so as to secure said bearing assembly within said cam assembly bore; a first gear within the gearbox mounted on a first shaft, said shaft defined along a first axis; a second gear within the gearbox and mounted on a second shaft, said second shaft defined along a second axis that is substantially perpendicular to the first axis of the first shaft, said second shaft supported by said bearing assembly so that the second axis of the second gear and the second cam axis are co-axial; and wherein said cam assembly is rotatably movable from a first position to a second position wherein said second gear engages said first gear when said cam assembly is in the first position and wherein said second gear and first gear are disengaged when said cam assembly is in the second position.

Another example of a gearset comprises a gearbox; a cam assembly comprising a first cam body having an outer surface disposed around a first cam axis and an inner bore disposed around a second cam axis, a second cam body having an outer surface disposed around the first cam axis and an inner bore disposed around the second cam axis, and a crossbar joining said first and second cam bodies, wherein the first and second cam axis are axially offset from one another, wherein a portion of said inner bore is threaded; a bearing assembly disposed within said inner bore of said cam assembly; a threaded fastener engaging said threaded bore and abutting said bearing assembly so as to secure said bearing assembly within said cam assembly bore; a locking fastener securing said threaded fastener within said threaded bore; a first gear within the gearbox mounted on a first shaft, said shaft defined along a first axis; a second gear within the gearbox and mounted on a second shaft, said second shaft defined along a second axis that is substantially perpendicular to the first axis of the first shaft, said second shaft supported by said bearing assembly so that the second axis of the second gear and the second cam axis are co-axial; and wherein said cam assembly is rotatably movable from a first position in which said second gear engages said first gear to a second position in which said second gear and first gear are disengaged.

Another example a gearset comprises a gearbox; a first gear within the gearbox mounted on a first shaft, said shaft defined along a first axis; a second gear within the gearbox and mounted on a second shaft, said second shaft defined along a second axis that is substantially perpendicular to the first axis of the first shaft, said second shaft supported by said bearing assembly so that the second axis of the second gear and the second cam axis are co-axial; a cam assembly comprising a first cam body having an outer surface disposed around a first cam axis and an inner bore disposed around a second cam axis, wherein the first and second cam axii are axially offset from one another and an end cap extending from the first cam body, said end cap having an outer surface and axially aligned with said first cam axis and further including an aperture therein axially aligned with said second cam axis such that said second shaft extends through said aperture, said end cap further comprising at least one o-ring groove in the outer surface of said end cap; an o-ring disposed within said o-ring groove of said end cap; an end collar separable from said gearbox and in sealing engagement with said o-ring, said end collar attached to said gearbox so as to enclose said cam assembly within said gearbox; a bearing assembly disposed within said inner bore of said cam assembly and supporting said second shaft; and wherein said cam assembly is rotatably movable from a first position in which said second gear engages said first gear to a second position in which said second gear and first gear are disengaged.

One example of a method for manufacturing a disengagable reduction gearbox, said method comprises the steps of: providing a gearbox comprised of an upper portion and a lower portion; wherein the upper portion comprises a cam assembly comprised of a first cam body having an outer surface disposed around a first cam axis and an inner bore disposed around a second cam axis, wherein the first and second cam axii are axially offset from one another, wherein a portion of said inner bore is threaded so as to form a threaded inner bore; a bearing assembly disposed within said threaded inner bore of said cam assembly; a threaded fastener engaging said threaded bore and abutting said bearing assembly so as to secure said bearing assembly within said cam assembly bore; and a second gear within the gearbox mounted on a second shaft; wherein the lower portion comprises a first gear within the gearbox mounted on a first shaft, said shaft defined along a first axis; wherein said second shaft defined along a second axis that is substantially perpendicular to the first axis of the first shaft, said second shaft supported by said bearing assembly so that the second axis of the second gear and the second cam axis are co-axial, wherein said cam assembly is rotatably movable from a first position to a second position wherein said second gear engages said first gear when said cam assembly is in the first position and wherein said second gear and first gear are disengaged when said cam assembly is in the second position; preloading the bearing assembly; assembling the upper portion to the lower portion; and wherein the preloading is accomplished before the assembling.

The features and advantages of the present invention will be apparent to those skilled in the art with the benefit of this disclosure. While numerous changes may be made by those skilled in the art, such changes are within the spirit of the present invention.

BRIEF DESCRIPTION OF THE DRAWINGS

A more complete understanding of the present disclosure and advantages thereof may be acquired by referring to the following description taken in conjunction with the accompanying figures, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the present invention to the particular forms disclosed, but on the contrary, the intention is to cover all modifications, equivalents, and alternatives falling within the spirit and scope of the present invention as defined by the appended claims.

DESCRIPTION OF PREFERRED EMBODIMENTS

The present invention relates generally to disengagable reduction gear units having bearings that are preloaded. Methods of use are also provided.

Generally, the present invention provides a reduction gear units and systems having cam assemblies capable of disengaging a first gear from a second gear. In certain embodiments, a bearing assembly is provided for the second gear that is capable of being preloaded prior to certain assembly steps. Numerous other components, as detailed below, may form part of the system depending on the particular embodiment.

Advantages of the methods and devices of the present invention include, but are not limited to, the ability to preload the bearing assembly early in the gearset assembly process, improved sealing of certain components, and other advantages that will be apparent with the benefit of this disclosure.

To facilitate a better understanding of the present invention, the following examples of certain embodiments are given. In no way should the following examples be read to limit, or define, the scope of the present invention.

FIGS. 1a, 1b, 1c and 1d illustrate the disengagable gearbox 10 of the present invention, which gearbox 10 is generally comprised of a housing or case 12, an input shaft 14, an output shaft 16, a hub mounted 18 mounted on output shaft 16 and a handle assembly 20. Handle assembly 20 can be moved from a first position, shown in FIG. 1a, to a second position, shown in FIG. 1b, thereby permitting gears (not shown) in the gearbox 10 to be engaged or disengaged.

Figure 1A:
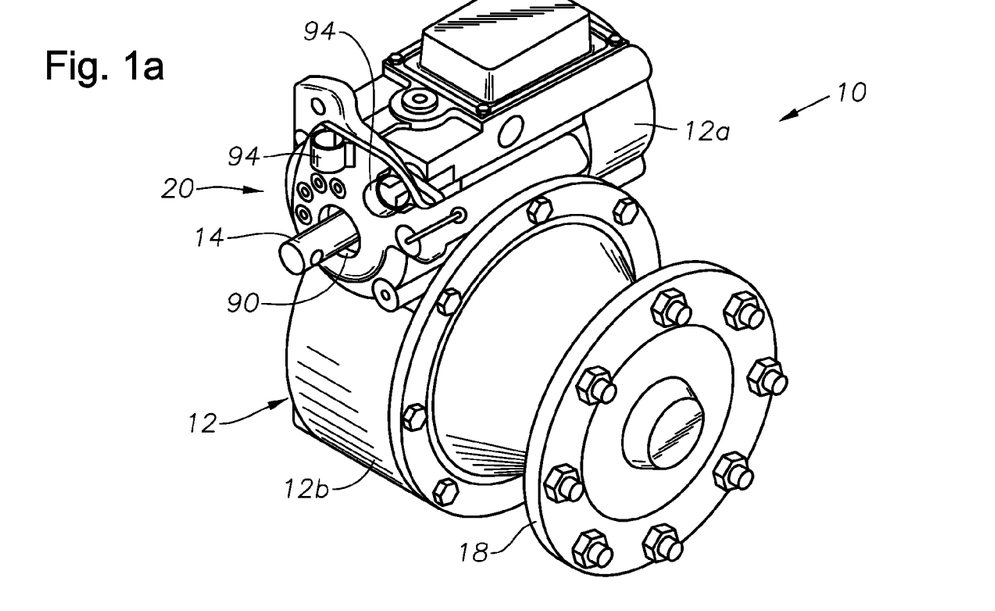
FIGS. 1a, 1b, 1c, and 1d illustrate perspective and side views of a disengagable gearbox in accordance with one embodiment of the present invention.
Figure 1B:
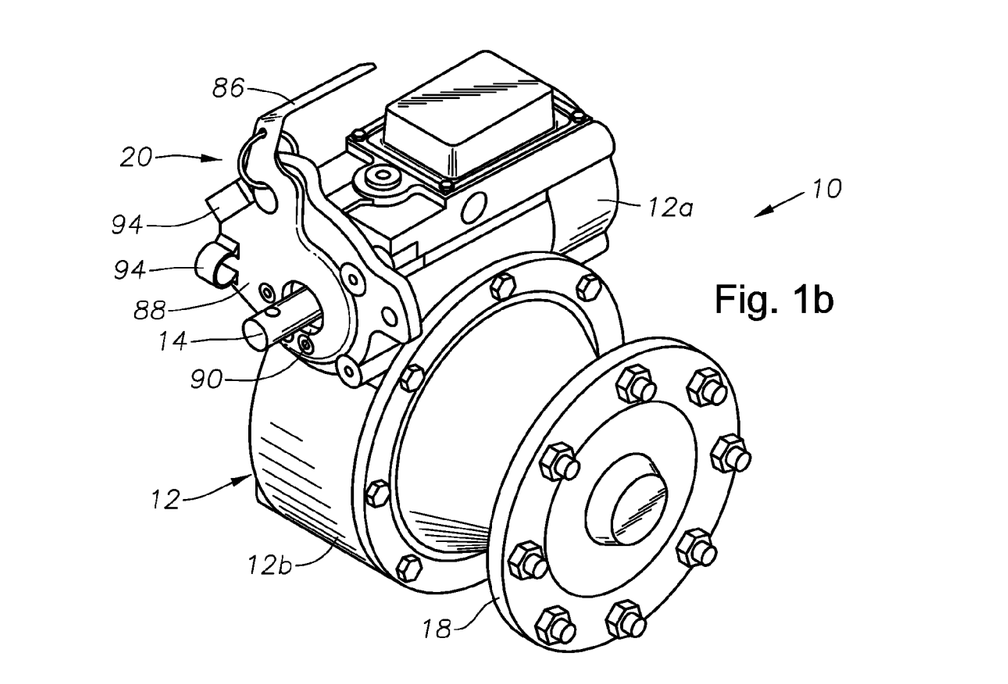
Figure 1C:
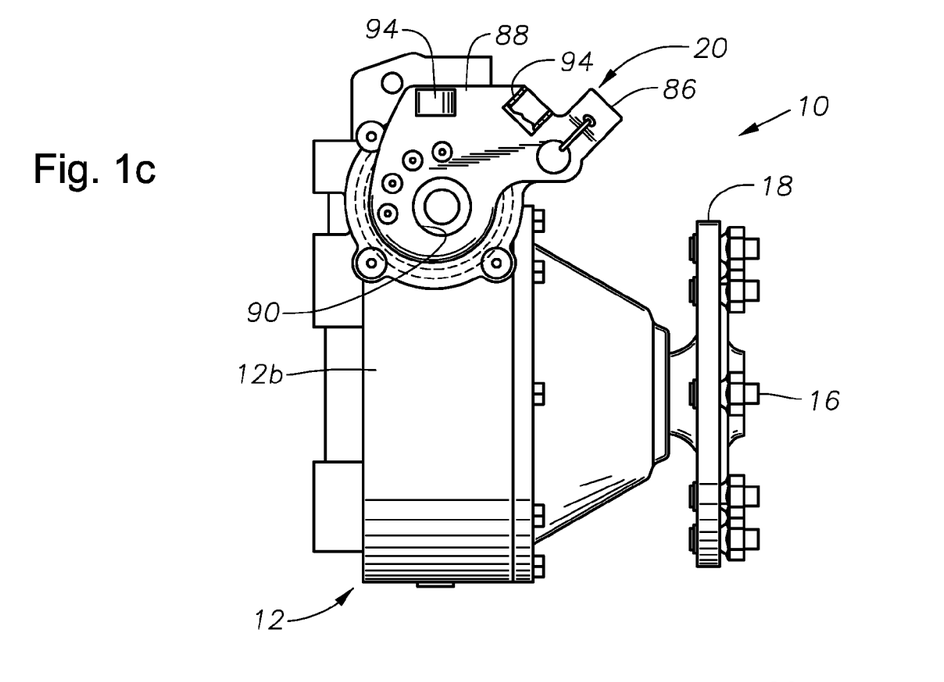
Figure 1D:
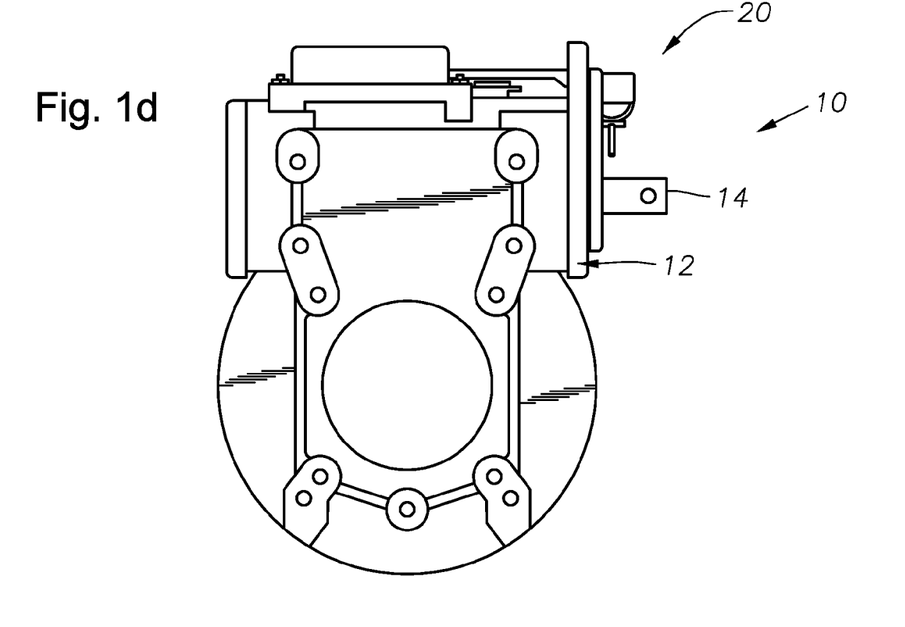
Figure 2A:
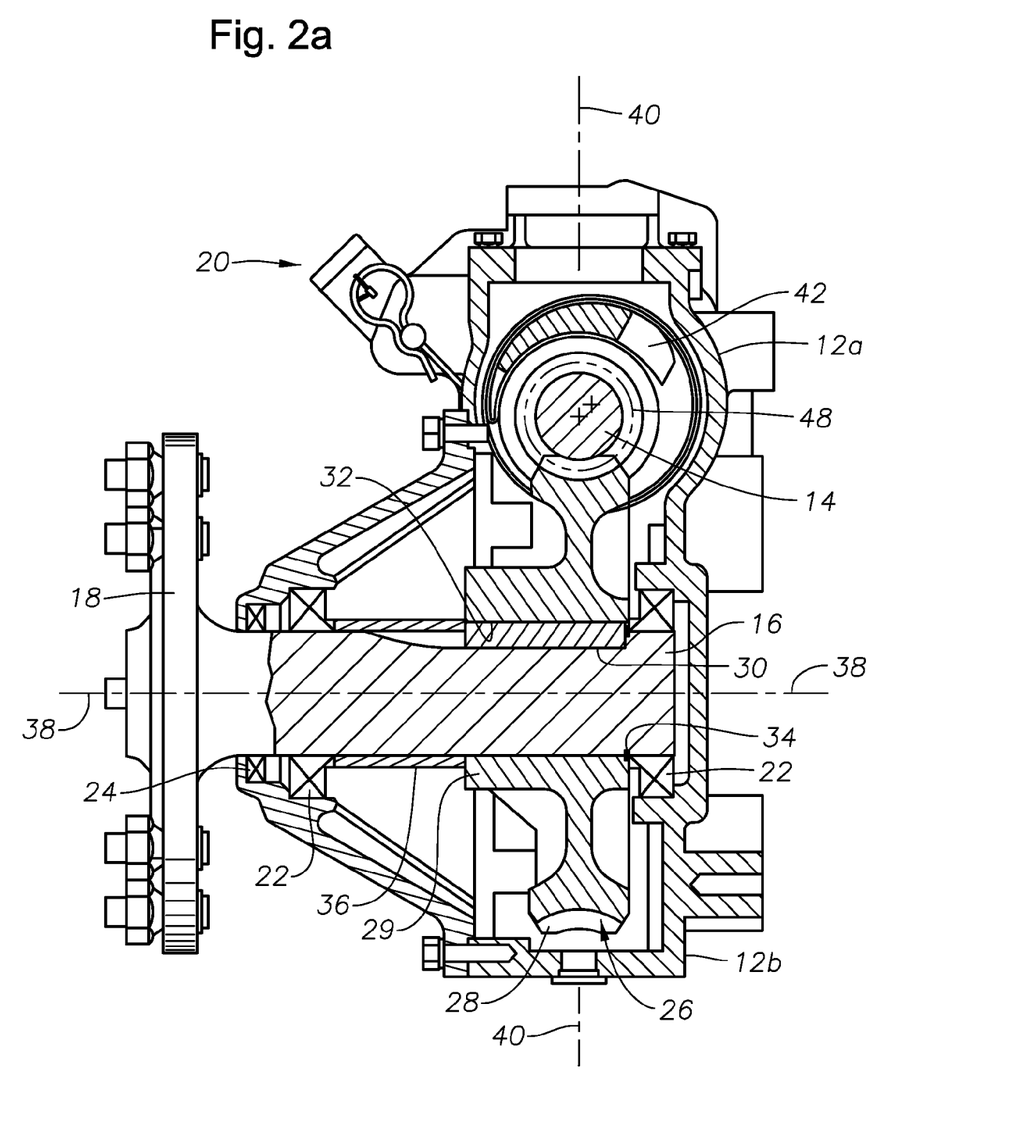
FIGS. 2a and 2b illustrate cross-sectional views of a disengagable gearbox in accordance with one embodiment of the present invention.
Figure 2B:
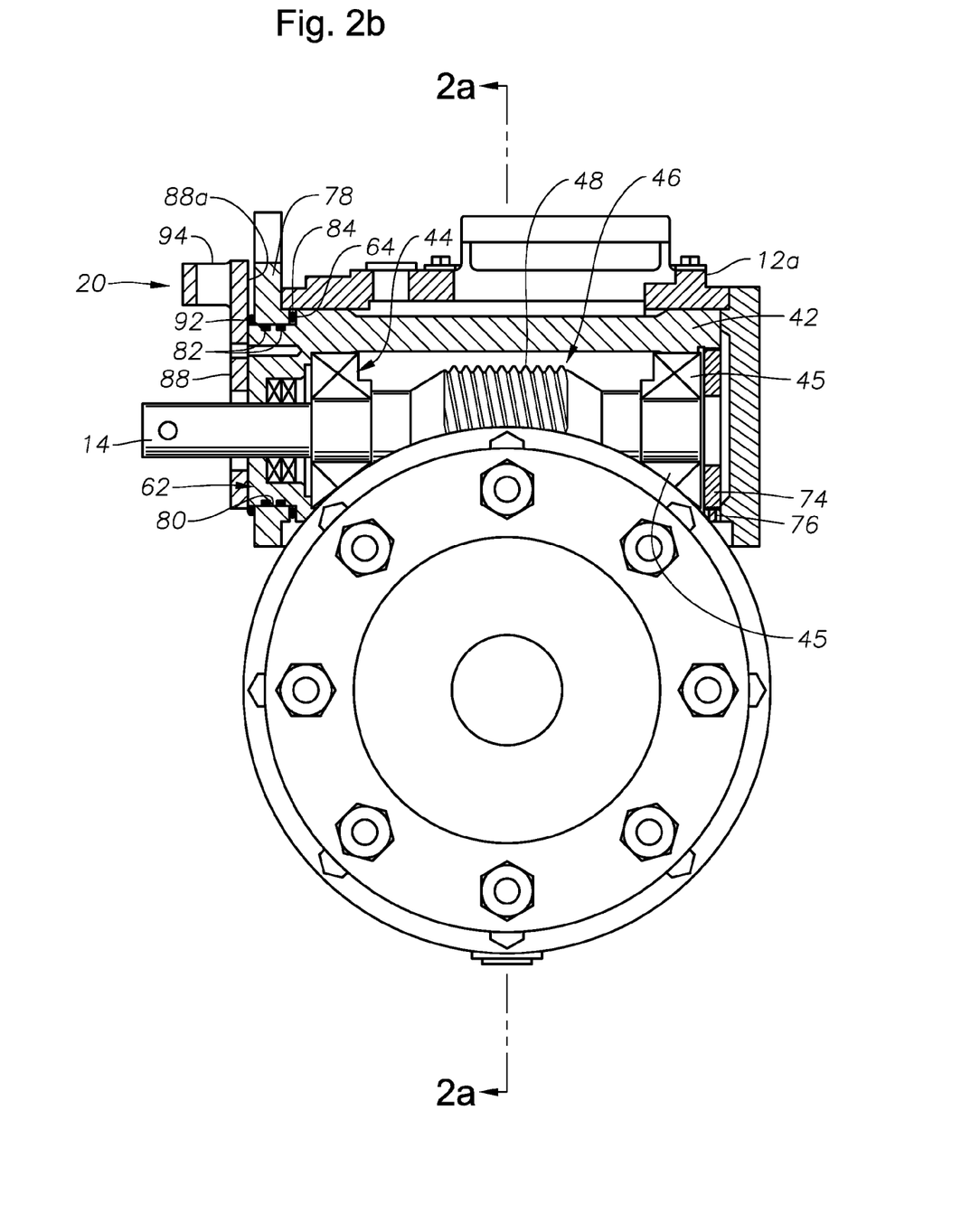

With reference to FIGS. 2a and 2b, case 12 is shown as having an upper portion 12a and a lower portion 12b. Output shaft 16 is disposed in lower portion 12b of case 12, supported by bearings 22. An oil seal 24 is provided where shaft 16 protrudes from case 12.

Mounted on shaft 16 is a gear 26. In one preferred embodiment, gear 26 is a worm gear with teeth 28. Gear 26 may be mounted on shaft 16 in any conventional manner. In one preferred embodiment, a key 30 may be provided on shaft 16 to engage a slot 32 in gear 26, permitting gear 26 to be oriented and radially secured on shaft 16. A fastener 34, such as a retaining ring, may be further used to secure gear 26 on shaft 16. To further ensure positioning of shaft 16 in case 12, a spacer 36 may be disposed on shaft 16 between gear 26 and bearing 22.

As shown in 2a, shaft 16 is defined along an output shaft axial reference axis 38. Reference axis 38 also passes through the hub 29 of gear 26 when gear 26 is aligned on shaft 16. Gear 26 can likewise be characterized as having a radial reference axis 40 around which teeth 28 are symmetrically disposed.

Disposed in the upper portion 12a of case 12 is a cam assembly 42 which generally supports input shaft 14 so as to be substantially perpendicular to output shaft 16. More specifically, input shaft 14 is supported by a bearing assembly 44 mounted in cam assembly 42. The major axii of cam assembly 42 (as discussed below) are substantially perpendicular to output shaft axial reference axis 38. Handle assembly 20 is attached to cam assembly 42.

Bearing assembly 44 is comprised of one or more bearings 45. In one embodiment of the present invention, bearings 45 are adjustable load bearings. More preferably, one or more of bearings 45 are thrust bearings, particularly of the cone and cup or tapered roller type.

Disposed on input shaft 14 is a gear 46. In one preferred embodiment, gear 46 is a threaded worm shaft which threads 48 mesh with teeth 28 of gear 26 when gear 26 and gear 46 are engaged.

Figure 3A:
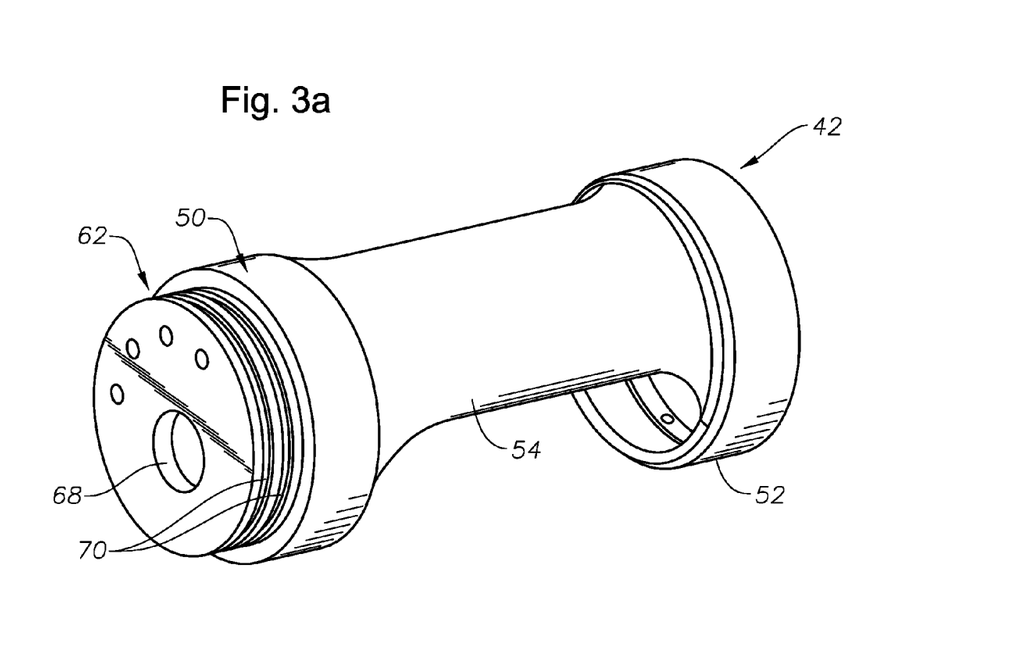
FIGS. 3a, 3b, 3c, 3d, and 3e illustrate perspective, side, and cross-sectional views of a cam assembly in accordance with one embodiment of the present invention.
Figure 3B:
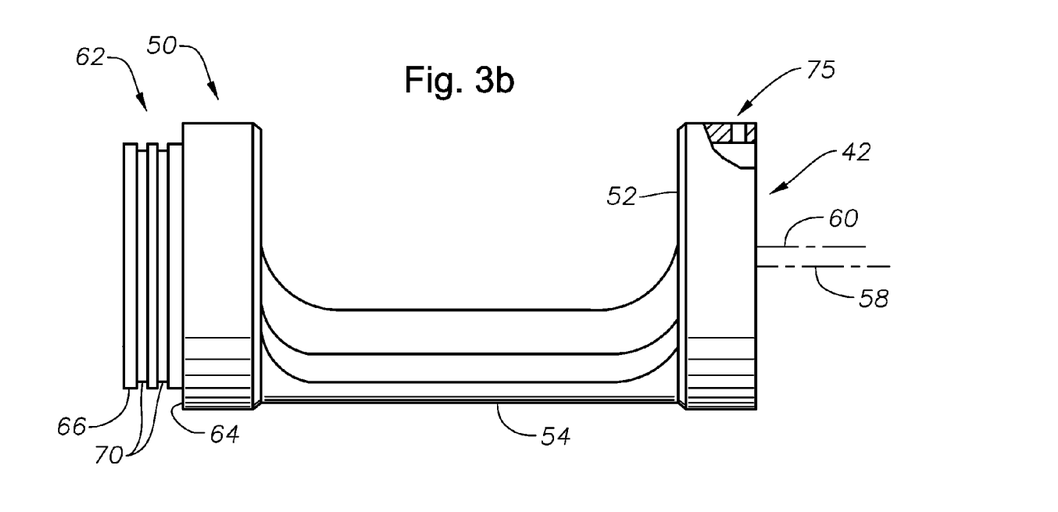
Figure 3C:
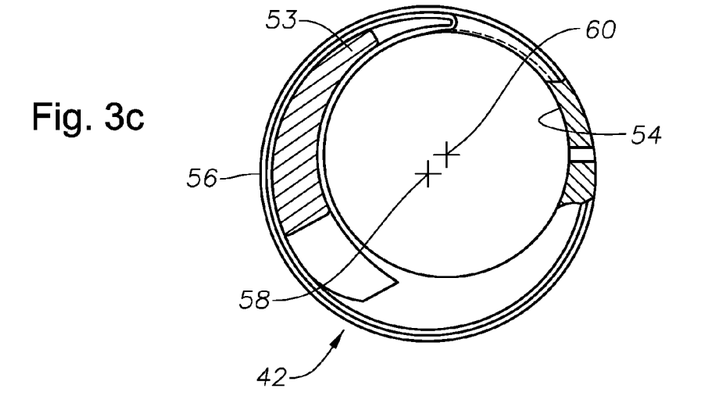

Turning to FIGS. 3*a*-3*e*, cam assembly 42 is illustrated. In one preferred embodiment illustrated in FIGS. 3*c* and 3*e*, cam assembly 42 is comprised of a single cam body 50. In this embodiment, cam body 50 is generally cylindrical in shape and is characterized by an outer wall 53 and an inner bore 54. Outer wall 53 has an outer surface 56. As best seen in FIG. 3*c*, outer wall 53 varies in thickness, i.e., tapers, around its circumference. As such, outer surface 56 can be characterized as being centered around a first axis 58, while bore 54 can be characterized as being centered around a second axis 60 which is radially offset from axis 58. Axial rotation of cam body 50 thus results in an eccentric movement of cam body 50. The taper of wall 53 creates eccentric movement of cam assembly 42 as it is rotated from a first position to a second position, so as to permit gears 46 and 26 to engage and disengage.

Figure 3D:
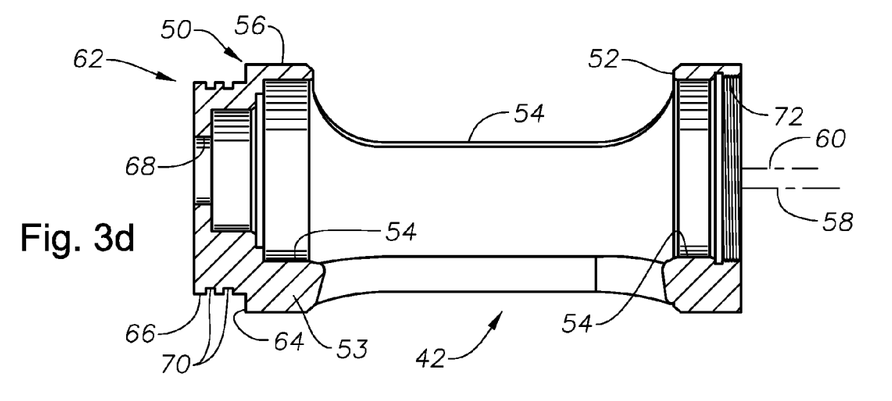
Figure 3E:
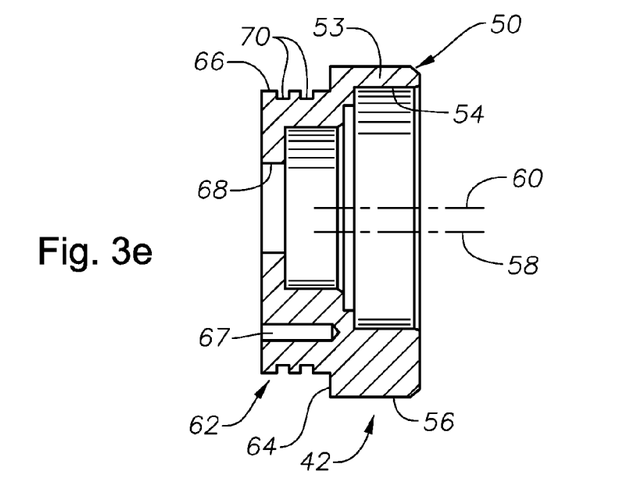

As best seen in FIG. 3*e*, cam body 50 also includes an end cap 62 extending therefrom so as to form a shoulder 64. End cap 62 can also be characterized as having an outer surface 66 which is centered around first axis 58. An aperture 68 is disposed in end cap 62 which aperture is centered around second axis 60, thus appearing "off center" with respect to outer surface 66, as best illustrated in FIG. 3*a*. End cap 62 has at least one, and preferably at least two, o-ring grooves 70 disposed in outer surface 66. End cap 62 may also be disposed for receipt of a fastener, such as is shown at 67, to permit handle assembly 20 to be secured thereto.

Bore 54 is disposed for receipt of a bearing that comprises bearing assembly 44.

In another preferred embodiment, cam assembly 42 is comprised of cam body 50 and cam body 52, joined by a crossbar or arm 54. In this embodiment, cam bodies 50, 52 and arm 54 may be integrally formed as a single component of one piece construction. Cam body 52 is similarly formed with respect to cam body 50, being generally cylindrical in shape and characterized by an outer wall 52 and an inner bore 54. Outer wall 53 has an outer surface 56. The thickness of outer wall 53 tapers around its periphery and outer surface 56 can be characterized as being centered around first axis 58, while bore 54 can be characterized as being centered around second axis 60 which is radially offset from axis 58. As such, bore 54 of cam body 52 and bore 54 of cam body 50 are aligned.

The foregoing cam assembly 42 having two eccentric bore bosses or cam bodies is desirable, because the cam bodies, being disposed adjacent opposite ends of gear 48, permit a uniform rotational/translational force to be applied to gear 48 as it moves along its eccentric path, which has the effect of increasing worm gear mesh life. Likewise, the load on any one bearing 45 is reduced, which is particularly desirable when cam assembly 42 is moved between its first and second positions, i.e., the point where thrust or axial forces on bearings 45 are likely to be maximized. Again, this is likely to have the effect of lengthening the operational life of the bearings. Furthermore, the arrangement permits larger bearings to be utilized in association with cam assembly 42, which in turn permits a smaller or "shorter" gear case 12. Although the angular rotation of cam assembly 42 from the first position to the second position can be of any degree that permits the respective gears to be disengaged, in one preferred embodiment, the angular rotation is approximately 60° while in another preferred embodiment the angular rotation is approximately 90°.

Bore 54 of cam body 52 is also disposed for receipt of a bearing. A portion of bore 54 is threaded, as shown at 72, for receipt of a threaded bearing fastener 74 (shown in FIG. 2*b*) provided to constrain bearing 45 in bore 54. Additionally, cam body 52 is disposed at 75 for receipt of a second fastener 76 (shown in FIG. 2*b*), which is provided to secure bearing fastener 74 in place. The foregoing arrangement represents one novel aspect of the present invention since it permits bearing 45 to be pre-loaded to desired specifications before the bearing is assembled into gearbox 10 and then ensures that the selected bearing pre-load is maintained during assembly. More specifically, as threaded bearing fastener 74 is screwed into the threaded portion of bore 54, it applies an axial force on bearing 45 as it is seated in bore 54. This axial force, which is the pre-load force, can be precisely adjusted due to the threaded nature of bearing fastener 74. Once the precise adjustment is achieved, second fastener 76, such as a set screw, is used to "lock" bearing fastener 74 into place, thereby insuring that the position of bearing fastener 74, and hence the "pre-load" force, is not inadvertently altered as the cam assembly 42 is inserted into case 12 during assembly of gearbox 10. In another embodiment, second fastener 76 may simply be another threaded fastener 74 that is screwed into bore 54 so as to lock the threaded bearing fastener 74 that abuts against bearing 45 into place.

Another novel aspect of the present invention is found in the manner in which cam assembly 42 is mounted and "sealed" within case 12. As shown in FIG. 2*b*, when cam assembly 42 is inserted into case 12, end cap 62 protrudes from the upper portion 12*a* of case 12. End collar 78 having a bore 80 there through is seated on end cap 62 to abut shoulder 64 so that the inner surface of collar 78 is disposed adjacent o-ring grooves 70. Bore 80 is sized so as to create a tight seal between end collar 78 and end cap 62 when an o-ring 82 is disposed within o-ring groove 70. End collar 78 is then fastened to case 12 by any standard means, such as fasteners (not shown). Those skilled in the art with the benefit of this disclosure will appreciate that the foregoing is preferable over the prior art, because rather than precisely machining an entire bore in case 12 (which is large and bulky) in order to effectuate a seal between cam assembly 42 and case 12, only the inner surface of collar 78 need be precisely machined. Machining this small surface on a small piece (collar 78) is much easier than machining the much larger surface area of case 12. Thus, a much better gearbox seal can be achieved much more easily utilizing the configuration of the present invention.

While such a seal can be achieved with a single o-ring 82, it is preferable that the seal have at least two o-rings 82. Additionally, an o-ring 84 may be provided at shoulder 64 to provide an additional seal between cam assembly 42, case 12 and end collar 78.

The foregoing gearbox sealing arrangement is also desirable, because it permits a single lubricant disposed within case 12 to be utilized to lubricate both gearset 48 and bearing assembly 44, rather than utilizing separate lubrication systems.

As described above, handle assembly 20 attaches to cam assembly 42, and more specifically, end cap 62, to permit cam assembly 42 to be moved between engagement and disengagement positions between gears 16 and 26. With reference to FIGS. 1*a*, 1*b*, 1*c* and 2*b*, handle assembly 20 is comprised of handle 86 and shield plate 88. Preferably, handle 86 and shield plate 88 are integrally formed. Disposed in shield plate 88 is an aperture 90 through which input shaft 14 passes, as shown in FIG. 2*b*. Inner side 88*a* of shield plate 88 abuts end cap 62. In one preferred embodiment, o-ring 92 may be provided between inner side 88a of shield plate 88 and end cap 62, forming an "external" seal, which is useful in preventing dirt or other debris from migrating into gearbox 12. Handle 86 may also include sleeve 94 or similar aperture to permit a lever (not shown) to utilize handle assembly 20.

Figure 4:
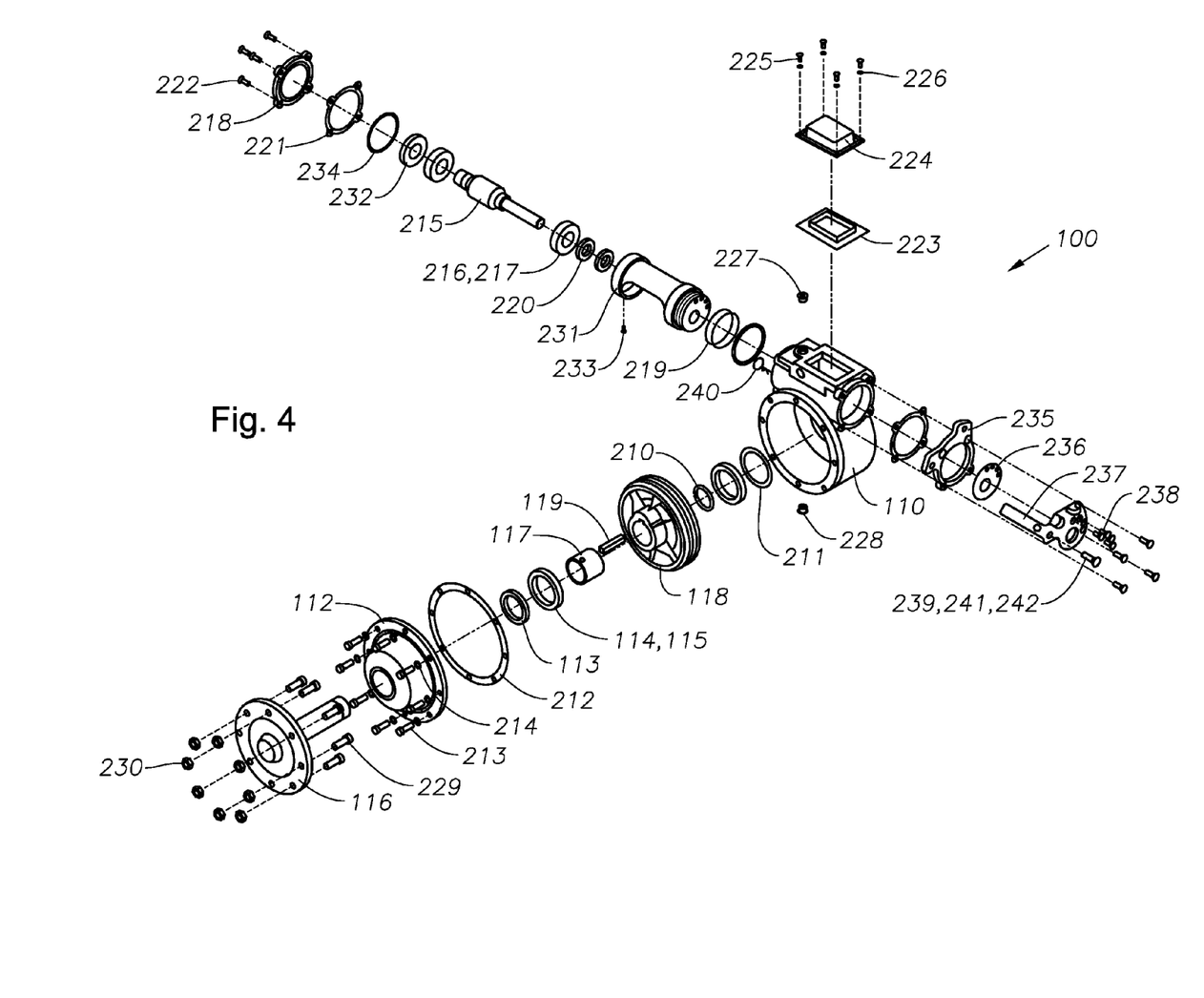
FIG. 4 is an exploded view of the gearbox of the invention.

An exploded view of the gearbox of the invention is illustrated in FIG. 4, wherein gearbox 100 is comprised of a housing 110, a output cap 112, an output oil seal 113, an output bearing cup 114, an output bearing cone 115, a flanged output shaft 116, an output spacer 117, a worm gear 118, a output key, 119, a retaining ring 210, an output shim 211 for the inboard bearing, an output shim 212 for the cap, output cap fasteners 213, output cap lock washers 214, a worm shaft 215, an input bearing cup 216, an input bearing cone 217, an input end cap 218, o-rings 219, an input oil seal 220, an input cap shim 221, an input cap fastener 222, a diaphragm 223, an expansion chamber 224, fasteners 225, lock washers 226, a flange pipe plug 228 and o-ring 229, studs 229, wheel nuts 230, a right hand cam 231, bearing cup nut 232, set screws 233, thrust washers 234, a right hand side end cap 235, a right hand shield 236, a right hand handle 237, cap screws 238, a handle lock pin 239, a hitch pin 240 and a wire rope strap 241.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A gearset comprising:
   a gearbox;
   a first gear within the gearbox mounted on a first shaft, said first shaft defined along a first gearbox axis;
   a second gear within the gearbox and mounted on a second shaft, said second shaft defined along a second gearbox axis that is substantially perpendicular to the first gearbox axis of the first shaft;
   a cam assembly comprising:
   a first cam body having an outer surface with a cam body outer diameter disposed around a first cam axis and an inner bore having a first diameter disposed around a second cam axis, wherein the first cam axis and second cam axis are axially offset from one another and
   an end cap characterized by a length, the end cap extending from the first cam body, said end cap having an outer surface with an end cap outer diameter and axially aligned with said first cam axis and further including an inner bore having a diameter smaller than the first diameter, the inner bore extending along the length of the end cap and axially aligned with the second cam axis, an aperture having a second diameter smaller than the first diameter, the aperture axially aligned with said second cam axis such that said second shaft extends through said aperture, wherein the end cap outer diameter is less than the cam body outer diameter so as to form a shoulder where the end cap extends from the first cam body, said end cap further comprising at least one o-ring groove in the outer surface of said end cap;
   an input oil seal disposed within the inner bore of the end cap;
   an o-ring disposed within said o-ring groove of said end cap;
   an end collar separable from said gearbox and in sealing engagement with said o-ring, said end collar attached to said gearbox so as to enclose said cam assembly within said gearbox, said end collar disposed around the end cap in sealing engagement with the o-ring disposed within said o-ring groove of said end cap;
   a bearing assembly disposed within said inner bore of said cam assembly and supporting said second shaft;
   a shield plate secured to said end cap of said cam assembly, said shield plate having an inner side and an outer side and an aperture through which said second shaft extends, said gearset further comprising an o-ring disposed between said inner side of said shield plate and said end collar,
   wherein said second shaft is supported by said bearing assembly so that the second gearbox axis of the second gear and the second cam axis are co-axial; and
   wherein said cam assembly is rotatably movable through an angular distance from a first position in which said second gear engages said first gear to a second position in which said second gear and first gear are disengaged.

2. The gearset of claim 1 further comprising a handle assembly secured to said cam assembly and capable of moving said cam assembly from said first position to said second position.

3. The gearset of claim 1 wherein said first gear is a worm gear and said second gear comprises threads disposed around said second shaft.

4. The gearset of claim 1 wherein the angular distance between said first position and said second position is greater than 60 degrees.

5. The gearset of claim 1 wherein the angular distance between said first position and said second position is approximately 90 degrees.

6. A gearset comprising:
   a gearbox;
   a first gear within the gearbox mounted on a first shaft, said first shaft defined along a first gearbox axis;
   a second gear within the gearbox and mounted on a second shaft, said second shaft defined along a second gearbox axis that is substantially perpendicular to the first gearbox axis of the first shaft;
   a cam assembly comprising
   a first cam body having an outer surface disposed around a first cam axis and an inner bore having a first diameter disposed around a second cam axis, wherein the first cam axis and second cam axis are axially offset from one another and
   an end cap extending from the first cam body, said end cap having an outer surface and axially aligned with said first cam axis and further including an aperture having a second diameter smaller than the first diameter, the aperture axially aligned with said second cam axis such that said second shaft extends through said aperture, said end cap further comprising at least one o-ring groove in the outer surface of said end cap;
   an o-ring disposed within said o-ring groove of said end cap;
   an end collar separable from said gearbox and in sealing engagement with said o-ring, said end collar attached to said gearbox so as to enclose said cam assembly within said gearbox;

a bearing assembly disposed within said inner bore of said cam assembly and supporting said second shaft;

a handle assembly is secured to said end cap of said cam assembly, wherein said handle assembly comprises a handle secured to a shield plate, said shield plate having an inner side and an outer side and an aperture through said shield plate through which said second shaft extends, said gearset further comprising an o-ring disposed between said inner side of said shield plate and said end collar, wherein said second shaft is supported by said bearing assembly so that the second gearbox axis of the second gear and the second cam axis are co-axial; and wherein said cam assembly is rotatably movable through an angular distance from a first position in which said second gear engages said first gear to a second position in which said second gear and first gear are disengaged.

7. The gearset of claim 6, wherein the end cap extends beyond the end collar to form a shoulder on which the o-ring disposed between said inner side of said shield plate and said end collar is mounted, thereby forming a seal between the end collar, the outer surface of the end cap and the shield plate.

8. A gearset comprising:

a gearbox;

a first gear within the gearbox mounted on a first shaft, said first shaft defined along a first gearbox axis;

a second gear within the gearbox and mounted on a second shaft, said second shaft defined along a second gearbox axis that is substantially perpendicular to the first gearbox axis of the first shaft;

a cam assembly comprising a first cam body having an outer surface with a cam body outer diameter disposed around a first cam axis and an inner bore having a first diameter disposed around a second cam axis, wherein the first cam axis and second cam axis are axially offset from one another and an end cap extending from the first cam body, said end cap characterized by a length, the end cap having an outer surface with an end cap outer diameter and axially aligned with said first cam axis and further including an inner bore having a diameter smaller than the first diameter, the inner bore extending along the length of the end cap and axially aligned with the second cam axis, an aperture having a second diameter smaller than the first diameter, the aperture axially aligned with said second cam axis such that said second shaft extends through said aperture, wherein the end cap outer diameter is less than the cam body outer diameter so as to form a shoulder where the end cap extends from the first cam body;

at least one o-ring groove in the outer surface of said end cap;

an o-ring disposed within said o-ring groove of said end cap;

an input oil seal disposed within the inner bore of the end cap;

an end collar separable from said gearbox and in sealing engagement with said o-ring, said end collar attached to said gearbox, said end collar is disposed adjacent said shoulder so as to enclose said cam assembly within said gearbox, said end collar disposed around the end cap in sealing engagement with the o-ring disposed within said o-ring groove of said end cap;

an o-ring disposed between said shoulder and said end collar to form a seal therebetween;

a bearing assembly disposed within said inner bore of said cam assembly and supporting said second shaft;

a shield plate secured to said end cap of said cam assembly, said shield plate having an inner side and an outer side and an aperture through which said second shaft extends, wherein the end cap extends beyond the end collar to form a shoulder on which the o-ring disposed between said inner side of said shield plate and said end collar is mounted, thereby forming a seal between the end collar, the outer surface of the end cap and the shield plate, wherein said second shaft is supported by said bearing assembly so that the second gearbox axis of the second gear and the second cam axis are co-axial;

wherein said cam assembly is rotatably movable through an angular distance from a first position in which said second gear engages said first gear to a second position in which said second gear and first gear are disengaged; and wherein said gearbox forms an enclosure therein in which both the second gear and the bearing assembly are contained, said gearset further comprising a lubricant disposed in said enclosure and capable of lubricating both the second gearset and the bearing assembly.

\* \* \* \* \*